United States Patent
Bourgart (10) Patent No.: US 11,683,114 B2
(45) Date of Patent: Jun. 20, 2023

(54) METHOD FOR ALLOCATING A POINT-TO-POINT CHANNEL TO A USER MODULE OF AN OPTICAL COMMUNICATION NETWORK, CORRESPONDING COMPUTER PROGRAM PRODUCT, STORAGE MEDIUM AND DEVICE

(71) Applicant: ORANGE, Issy-les-Moulineaux (FR)

(72) Inventor: Fabrice Bourgart, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/415,275

(22) PCT Filed: Dec. 11, 2019

(86) PCT No.: PCT/FR2019/053010
§ 371 (c)(1),
(2) Date: Jun. 17, 2021

(87) PCT Pub. No.: WO2020/128231
PCT Pub. Date: Jun. 25, 2020

(65) Prior Publication Data
US 2022/0029727 A1    Jan. 27, 2022

(30) Foreign Application Priority Data
Dec. 21, 2018 (FR) ........................ 1874030

(51) Int. Cl.
*H04J 14/00* (2006.01)
*H04J 14/02* (2006.01)
*H04J 14/08* (2006.01)

(52) U.S. Cl.
CPC .............. *H04J 14/02* (2013.01); *H04J 14/08* (2013.01); *H04J 2203/0069* (2013.01); *H04J 2203/0071* (2013.01)

(58) Field of Classification Search
CPC .... H04J 14/02; H04J 14/08; H04J 2203/0069; H04J 2203/0071; H04J 14/0246;
(Continued)

(56) References Cited

U.S. PATENT DOCUMENTS

| 9,479,284 B2 | 10/2016 | Kaneko et al. |
| 2010/0034535 A1* | 2/2010 | Guignard ........... H04Q 11/0067 398/168 |

FOREIGN PATENT DOCUMENTS

| EP | 2753010 A1 | 7/2014 |
| WO | 2015186194 A1 | 12/2015 |

(Continued)

OTHER PUBLICATIONS

Machine translation for Kenji et al. (WO 2015186194 A1).*
(Continued)

*Primary Examiner* — Hibret A Woldekidan
(74) *Attorney, Agent, or Firm* — David D. Brush; Westman, Champlin & Koehler, P.A.

(57) ABSTRACT

A method for allocating a point-to-point channel to a user module of an optical communication network. The network includes user modules and optical terminations, and supports point-to-multipoint channels and a plurality of point-to-point channels, one same point-to-point channel being assigned to one single optical termination. The method is implemented for a user module called a requester user module, and includes: detecting a predetermined availability signal conveyed by a point-to-point channel of the plurality of point-to-point channels; and allocating the point-to-point channel over which the predetermined availability signal is conveyed, called available point-to-point channel, to the requester user module.

12 Claims, 6 Drawing Sheets

(58) Field of Classification Search
CPC .. H04J 14/023; H04J 14/0228; H04J 14/0232; H04J 14/0234; H04J 14/0235; H04J 14/0236; H04J 14/0239; H04J 14/0242; H04J 14/0245; H04J 2014/0253; H04J 14/0279; H04J 14/0278
USPC .................. 398/69, 70, 71, 72, 93, 57, 79
See application file for complete search history.

(56) References Cited

FOREIGN PATENT DOCUMENTS

| WO | WO2015186194 | * | 12/2015 | ........... H04B 10/272 |
| WO | WO-2015186194 A1 | * | 12/2015 | ........... H04B 10/272 |
| WO | 2017104075 A1 | | 6/2017 | |

OTHER PUBLICATIONS

English translation of the Written Opinion of the International Searching Authority dated Apr. 17, 2020 for corresponding International Application No. PCT/FR2019/053010, filed Dec. 11, 2019.
International Search Report dated Apr. 2, 2020 for corresponding International Application No. PCT/FR2019/053010, Dec. 11, 2019.
Written Opinion of the International Searching Authority dated Apr. 2, 2020 for corresponding International Application No. PCT/FR2019/053010, filed Dec. 11, 2019.

* cited by examiner

METHOD FOR ALLOCATING A POINT-TO-POINT CHANNEL TO A USER MODULE OF AN OPTICAL COMMUNICATION NETWORK, CORRESPONDING COMPUTER PROGRAM PRODUCT, STORAGE MEDIUM AND DEVICE

CROSS-REFERENCE TO RELATED APPLICATIONS

This Application is a Section 371 National Stage Application of International Application No. PCT/FR2019/053010, filed Dec. 11, 2019, which is incorporated by reference in its entirety and published as WO 2020/128231 A1 on Jun. 25, 2020, not in English.

FIELD OF THE INVENTION

The invention relates to the field of optical communications networks.

More particularly, the invention relates to a technique for allocating point-to-point communication channels to user modules of an optical communication network.

The invention applies, particularly but not exclusively, to many optical networks, such as passive optical networks or PON, and more particularly to NG-PON or NG-PON2 type new generation optical networks (defined according to the standard ITU-T G.989) implementing both point-to-multipoint channels ("P2MP") and point-to-point channels ("PtP").

TECHNOLOGICAL BACKGROUND

In the last few years, increasingly growing bandwidth and service quality demands by users have led researchers to develop new architectures and new protocols for optical communication networks.

The PON architecture is a very common passive point-to-multipoint architecture, which offers a broadband optical access essentially to remote residential customers (typically over several tens of kilometres). The PON architecture is characterised by the absence of active equipment between the central office and the served homes, and by sharing the optical fibre between several user modules located in the upstream portion of the network, by means of achromatic couplers and in its FTTH (Fibre To The Home) variant by the absence of active equipment between the central office and the served homes.

Figure 1:
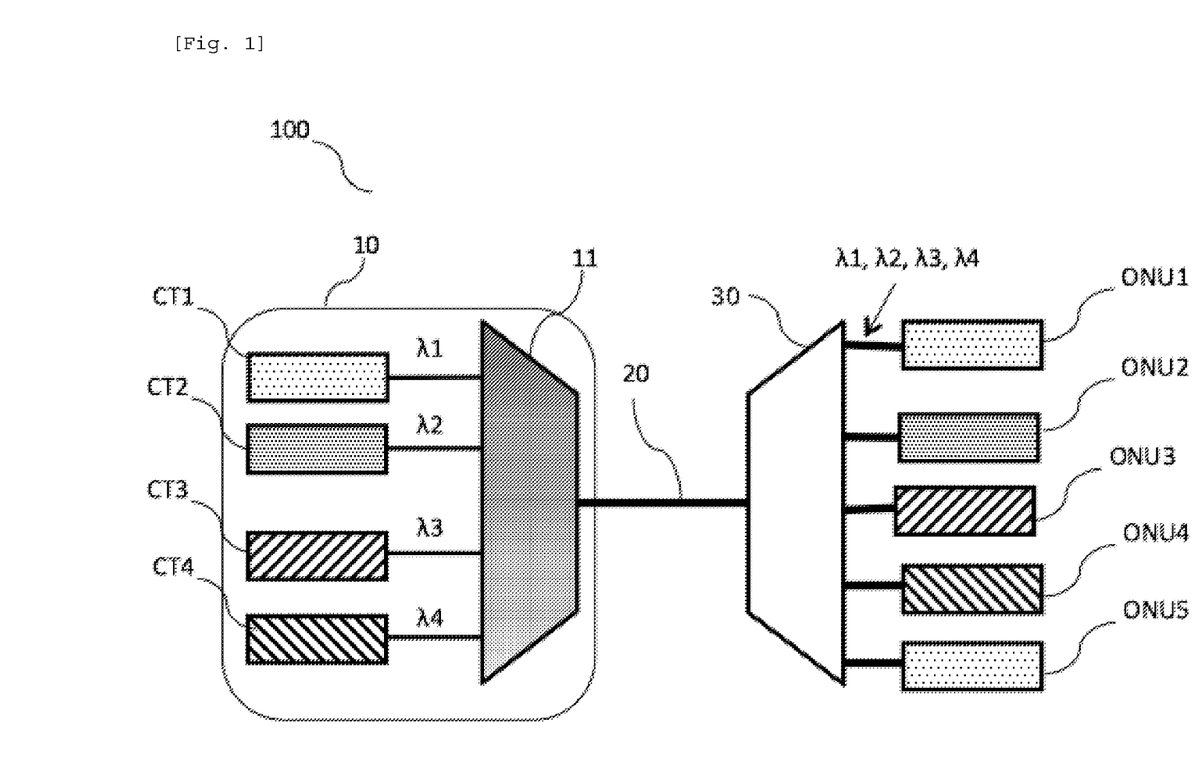
FIG. 1, already described in connection with the prior art, schematically represents a conventional PON TWDM communication network.

As illustrated in FIG. 1, a PON network 100 conventionally comprises an optical line terminal (OLT) 10 located at the central office (CO), a set of optical terminations (or CT, standing for "Channel Termination") CT1 to CT4, a wavelength multiplexer 11, an optical fibre 20, an achromatic coupler 30, as well as a set of remote user modules (or ONU, standing for "Optical Network Unit") ONU 1 to ONU5. The terminations CT1 to CT4 and the multiplexer 11 comprised within the terminal 10 are configured to optically serve the remote user modules ONU1 to ONU5 via the optical fibre 20 passively shared via the achromatic coupler 30. The PON network 100 is configured to support a plurality of communication channels implemented between the optical terminations CT1 to CT4 and the user modules ONU1 to ONU5. Each channel, characterised by a determined wavelength (respectively $\lambda 1$ to $\lambda 4$), is assigned to a distinct optical termination (CT1 to CT4) of the terminal 10. All of the wavelengths that are used herein are distinct from one another and predefined in advance according to the used standard, and each is characteristic of a determined optical termination of the terminal 10. On the user side, the achromatic coupler 30 serves each user module with the set of communication channels ($\lambda 1$ to $\lambda 4$), each user module being wavelength tuneable (or agile)

The PON network 100 implements a TWDM protocol which consists in a time-division wavelength multiplexing, allowing transmitting several optical signals over one single communication channel. Thus, one same channel with a determined wavelength assigned (or allocated) to an optical termination can be shared by several user modules, as is the case of the optical termination CT1 which supports the channel with the wavelength $\lambda 1$ serving both the user modules ONU1 and ONU5. This is referred to as point-to-multipoint channel or communication.

In comparison with conventional point-to-point architectures, the PON network allows reducing the number of required pieces of equipment (central office, optical fibres, etc.) thanks to sharing of the optical fibre.

The next generations of PON networks (such as the standard NG-PON2 for example) provide for the inclusion of point-to-point communication channels within the same original point-to-multipoint channels architecture, in order to offer data rates exceeding 10 Gbit/s. A point-to-point channel is an exclusive communicative connection between a user module and an optical termination.

Figure 2:
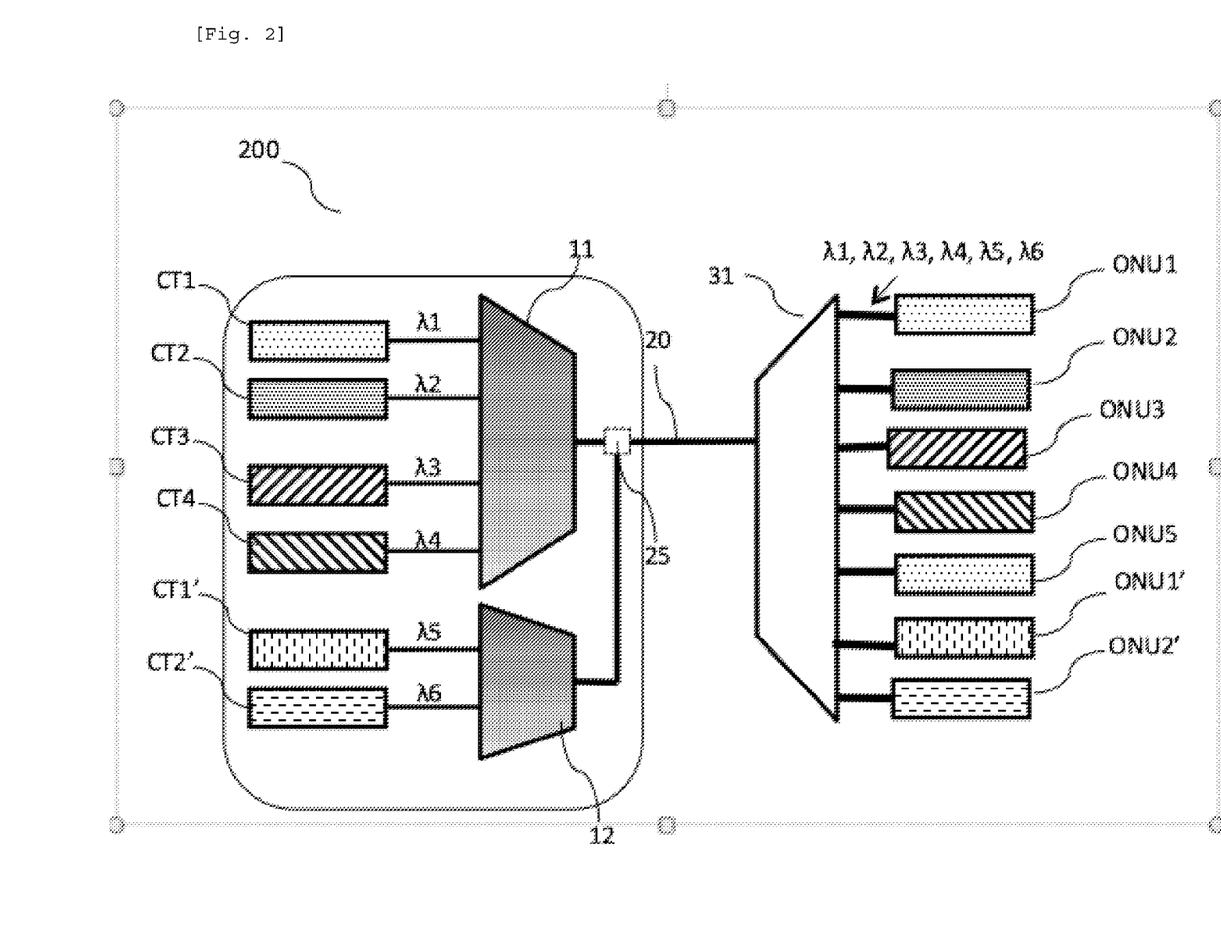
FIG. 2, already described in connection with the prior art, schematically represents a PON communication network based on both a point-to-multipoint transmission mode (TWDM) and a point-to-point transmission mode (WDM)

As illustrated in FIG. 2, the network 200 comprises not only user modules and optical terminations operating on the TWDM protocol (point-to-multipoint communication architecture), but also user modules and optical terminations operating in point-to-point. In FIG. 2, the point-to-point optical terminations are referenced CT1' to CT2'. The point-to-point channels with the wavelengths $\lambda 5$ and $\lambda 6$ are assigned respectively to CT1' and CT2', which are connected to a second wavelength multiplexer 12. The outlets of the first multiplexer 11 and of the second multiplexer 12 are linked by means of a wavelength combiner 25, which is configured to combine the channels with the wavelengths $\lambda 1$ to $\lambda 4$ originating from the multiplexer 11 with the channels with the wavelengths $\lambda 5$ and $\lambda 6$ originating from the multiplexer 12 in the optical fibre 20. An achromatic coupler 31 which serves not only the point-to-multipoint user modules ONU1 to ONU5 but also the point-to-point user modules ONU1' to ONU2' is connected at the other end of the optical fibre 20. Each user module ONU1' to ONU2' is associated to the set of communication channels ($\lambda 1$ to $\lambda 6$) and is wavelength tuneable (or agile).

Nonetheless, while there are point-to-multipoint protocols for achromatic PON networks allowing managing data collisions inherently, as those that are likely to intervene in the uplink communications direction (that is to say from a user module ONU towards an optical termination CT), this is not the case for existing point-to-point architectures. We talk about a collision when at least two optical data packets take on the same wavelength and wish to access the same piece of equipment at the same time.

Thus, when a user module requests the establishment of a point-to-point communication (for example when it is a new user module introduced in the network), it could (because of the inexistence of a collisions management protocol suited to this particular communication channel type) inadvertently emit over a point-to-point channel that is already used by another point-to-point user module, which would be a source of conflicts.

A known solution offering the possibility of using point-to-point communication channels in a PON network with collisions management is based on the WDM (standing for "Wavelength Division Multiplexing") optical systems technology, also commonly called WDM-PON networks. These are based on a wavelength-selective data transmission. This solution consists in using a point-to-point channel with a distinct wavelength for each user module, each then having a dedicated point-to-point channel up to the optical line terminal. This WDM-PON technology imposes the use of a chromatic wavelength demultiplexer on the user side, which implies the use of dedicated a channel with a distinct wavelength for each user of the network. In other words, such a solution is based on a predefined allocating the point-to-point channels to the different user modules (this is also referred to as predefined colourisation of the user modules), which is not optimal. In addition, such a solution supposes getting rid of the achromatic PON architecture discussed hereinabove (and therefore of the use of an achromatic coupler) which would pose a problem because of the achromatic PON infrastructure inventories that are already installed.

Thus, it could be particularly interesting to provide a technique for allocating point-to-point channels in a PON network, which allows avoiding the occurrence of collisions, said PON network being based on a point-to-multipoint communication architecture.

DISCLOSURE OF THE INVENTION

In a particular embodiment of the invention, a method for allocating a point-to-point channel to a user module of an optical communication network is provided, said network comprising user modules and optical terminations, and supporting point-to-multipoint channels and a plurality of point-to-point channels, one same point-to-point channel being assigned to one single optical termination, said method being implemented for a user module called requester user module, and comprising the following steps:
  detecting a predetermined availability signal conveyed by a point-to-point channel of said plurality of point-to-point channels;
  allocating the point-to-point channel over which said predetermined availability signal is conveyed, called available point-to-point channel, to said requester user module.

Thus, the present invention is based on a new approach consisting in finding an available point-to-point channel amongst said plurality of point-to-point channels of an optical communication network, through a simple analysis of the signals conveyed by the point-to-point channels from the optical terminations. Thus, the present invention aims to allocate to a user module of the optical network an available point-to-point channel, amongst the plurality of point-to-point channels, upon detecting a predetermined availability signal originating from an available optical termination. Thus, this approach avoids an allocating point-to-point channels that would be unavailable, thereby preventing the occurrence of optical data collisions on the same channel. This approach also has the advantage of being suited to optical distribution networks sharing both point-to-multipoint channels and point-to-point channels by conveying them over at least one same optical fibre to a determined point.

According to a particular implementation of the method, the detection step comprises a step of verifying whether the predetermined availability signal is detected on a first point-to-point channel amongst said plurality of point-to-point channels, and:

in the case of a positive verification, allocating the first point-to-point channel to said requester user module;
  in the case of a negative verification, verifying whether the predetermined availability signal is detected on a second point-to-point channel amongst said plurality of point-to-point channels.

Thus, by avoiding carrying out an exhaustive scanning covering all point-to-point channels, the energy consumption of the user modules is reduced.

According to a variant of implementation of the method, the detection step comprises a step of verifying, on each point-to-point channel of said plurality of point-to-point channels, whether the predetermined availability signal is detected, and
  in the case of a positive verification for one single point-to-point channel of said plurality, allocating said single point-to-point channel to said requester user module;
  in the case of a positive verification for a set of point-to-point channels of said plurality, allocating a point-to-point channel to said requester user module selected amongst said set of point-to-point channels, a function of a predetermined communication quality criterion.

An exhaustive scanning of the point-to-point channels of the network allows offering the possibility of allocating a point-to-point channel having a sufficient communication quality level. In a particular implementation, it is the point-to-point channel having the highest communication quality level of said set which is allocated to the requester user module.

According to a particular aspect of the invention, the detection step is triggered on apparition of a condition belonging to the group comprising:
  detecting a request for allocating a point-to-point channel;
  detecting a malfunction of an optical termination;
  deducting a maintenance of an optical termination;
  introducing a new user module in the network;
  introducing a new optical termination in the network;
  detecting a point-to-point channel change request;
  detecting a communication quality level below a predetermined threshold between a user module and an optical termination of the network involved in a point-to-point channel of said plurality.

In the last case, this allows proceeding with a reallocating a point-to-point channel to a user module involved in a point-to-point channel with an insufficient communication quality.

According to a particular aspect of the invention, the method further comprises, after the step of allocating the available point-to-point channel, a step of transmitting over the available point-to-point channel a query for using the available point-to-point channel, to the optical termination to which said available point-to-point channel is assigned.

In this manner, the optical termination concerned by the allocating the available point-to-point channel is informed on the intent of the requester user module to establish a point-to-point communication with it via this channel.

According to a particular aspect of the invention, an entity internal to the requester user module or external to the requester user module performs the step of allocating a point-to-point channel.

Thus, the allocating the point-to-point channel may be implemented either by the user module requesting the allocation itself, or by a dedicated external device.

In another embodiment of the invention, a method for allocating a point-to-point channel to a user module of an optical communication network is provided, said network comprising user modules and optical terminations, and supporting point-to-multipoint channels and a plurality of point-to-point channels, one same point-to-point channel being assigned to one single optical termination, said method being implemented for an optical termination of said plurality, called available optical termination, and comprising the following steps:

emitting a predetermined availability signal over the point-to-point channel assigned to said available optical termination, called available point-to-point channel, towards the user modules; and queuing a query for using the available point-to-point channel, originating from a user module, called requester user module.

On the optical termination side, the emission of the availability signal notifies the user module having received this signal that the concerned point-to-point channel is available and that an allocating this point-to-point channel to this user module is possible.

According to a particular feature, the method further comprises the following steps, upon reception of the query for using the available point-to-point channel:

stopping the emission of the predetermined availability signal over the available point-to point channel;

verifying the feasibility of establishment of a point-to-point communication over the available point-to-point channel between said requester user module and said available optical termination.

Stopping the emission of the predetermined availability signal by the optical termination means that it is no longer available and that it initiates the establishment of a point-to-point communication over the concerned channel.

According to a particular feature, the method further comprises the following steps:

in the case of a positive verification, establishing a point-to-point communication over the available point-to-point channel between said requester user module and said available optical termination;

in the case of a negative verification, re-emitting the predetermined availability signal over the available point-to-point channel.

Thus, in the case of success, the optical termination effectively establishes a point-to-point communication over the concerned channel. In the case of failure, the re-emission of the predetermined availability signal means that the establishment of a point-to-point communication has not succeeded and that the concerned optical termination remains available.

According to a particular aspect of the invention, the predetermined availability signal comprises information belonging to the group comprising:

information representative of a reference number associated to the available point-to-point channel;

information representative of a wavelength associated to the available point-to-point channel;

information representative of a frequency associated to the available point-to-point channel;

information representative of a modulation rate associated to the available point-to-point channel.

According to a particular implementation of the invention, the predetermined availability signal is emitted continuously. Such an implementation allows ensuring that the user module requesting an allocating a point-to-point channel receives the predetermined availability signal.

According to a variant of implementation, the predetermined availability signal is emitted discontinuously. Such a variant allows reducing the energy consumption of the optical termination.

In another embodiment of the invention, a computer program product which comprises program code instruction for the implementation of the aforementioned method is provided (in any one of its different embodiments), when said program is executed on a computer.

In another embodiment of the invention, a non-transitory computer-readable storage medium is provided, storing a computer program comprising a set of instructions executable by a computer to implement the aforementioned method (in any one of its different embodiments).

In another embodiment of the invention, a device for allocating a point-to-point channel to a user module of an optical communication network is provided, said network comprising user modules and optical terminations, and supporting point-to-multipoint channels and a plurality of point-to-point channels, one same point-to-point channel being assigned to one single optical termination, said device comprising, for a user module called requester user module:

means for detecting a predetermined availability signal conveyed by a point-to-point channel of said plurality of point-to-point channels;

means for allocating the point-to-point channel over which said predetermined availability signal is conveyed, called available point-to-point channel, to said requester user module.

Advantageously, the allocation device comprises means for implementing the detection and allocation steps performed thereby in the allocation method as previously described, in any one of its different embodiments.

In another embodiment of the invention, an optical termination comprised in an optical communication network is provided, comprising user modules and optical terminations, and supporting point-to-multipoint channels and a plurality of point-to-point channels, one same point-to-point channel being assigned to one single optical termination, said termination comprising:

means for emitting a predetermined availability signal over the point-to-point channel assigned to said available optical termination, called available point-to-point channel, towards the user modules; and means for queuing a query for using the available point-to-point channel originating from a user module, called requester user module.

Advantageously, the optical termination comprises means for implementing the emission and queuing steps performed thereby in the allocation method as previously described, in any one of its different embodiments.

LIST OF THE FIGURES

Other features and advantages of the invention will become apparent on reading the following description provided as an indicative and non-limiting example, and from the appended drawings, wherein.

DETAILED DESCRIPTION

In all figures of the present document, identical elements and steps are referred to by the same reference numeral.

In the following description, an example of implementation of the invention in a PON-type optical access network is considered. Of course, the invention is not limited to this particular example, and may apply to any optical communication network implementing a plurality of point-to-point channels.

Figure 3:
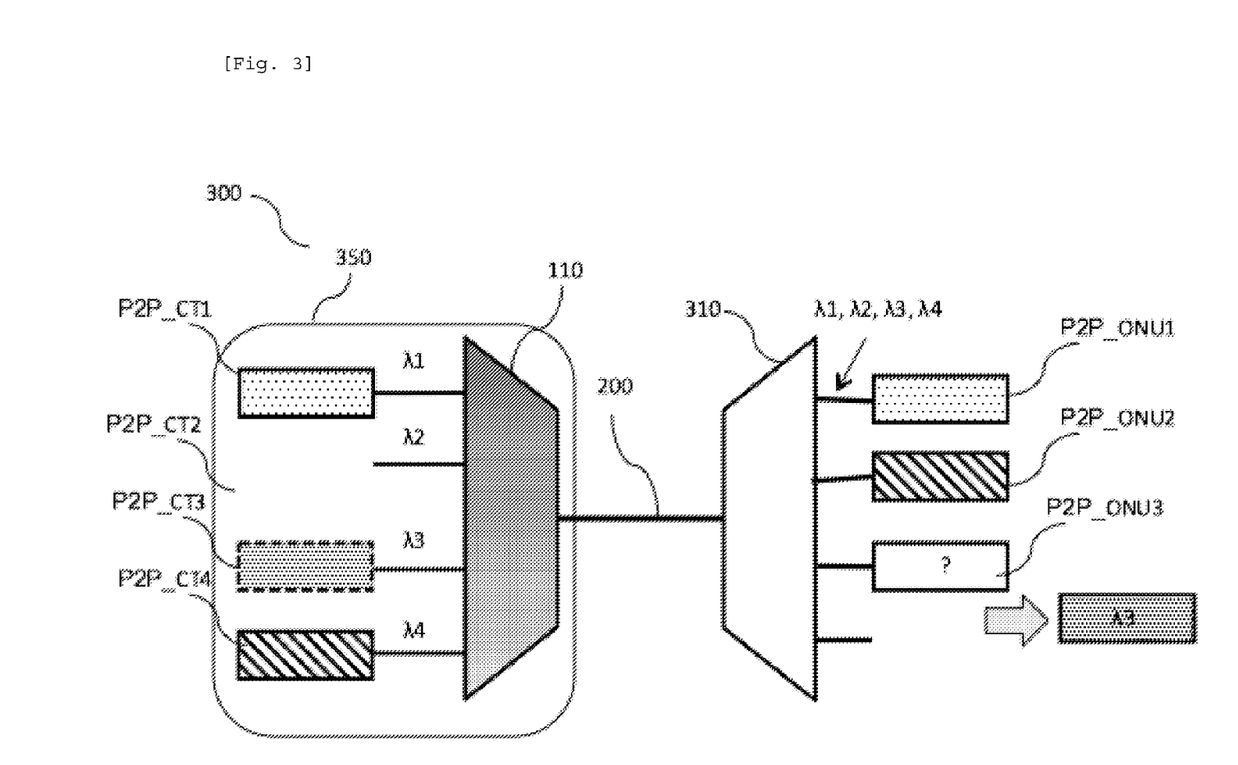
FIG. 3 presents a simplified diagram of an optical communication network in which the method according to a particular embodiment of the invention is implemented.

FIG. 3 presents a schematic example of an optical communication network 300 in which the allocation method according to a particular embodiment of the invention is implemented. For example, it may consist of a PON network based on both a point-to-multipoint transmission mode (TWDM) and a point-to-point transmission mode (WDM). Only the portion of the network relating to the point-to-point communications is herein represented in the figure, to simplify the description thereof.

Such an optical network 300 comprises three optical terminations P2P_CT1, P2P_CT3, P2P_CT4, a wavelength multiplexer 110, an optical fibre 200, an achromatic coupler 310, as well as three user modules P2P_ONU1, P2P_ONU2, P2P_ONU3. The optical terminations P2P_CT1, P2P_CT3, P2P_CT4 and the multiplexer 110 comprised within the terminal 350 are configured to optically serve the remote user modules by means of the optical fibre 200 and via the achromatic coupler 310. The optical network 300 is herein configured to support a set of four point-to-point optical channels, with the wavelengths λ1, λ2, λ3 and λ4, characteristic of the optical terminations P2P_CT1, P2P_CT2, P2P_CT3, P2P_CT4 respectively.

In general, a distinct point-to-point channel is assigned to each optical termination of the network and each user module is associated to the set (or to a subset) of the point-to-point channels. Thus, by "assigned", it should be understood that the considered channel is definitively associated, that is to say allocated to the optical termination for the establishment of a determined point-to-point communication, and by "associated", it should be understood that the considered channel is provisionally associated to the optical module to carry out the phase of detecting an available point-to-point channel before the allocation phase itself. Indeed, in order to avoid using the same term "allocation" to both the optical terminations and the user modules, the term "assignment" is herein used specifically for the optical terminations, and the term "allocation" is herein used specifically for the point-to-point user modules.

It will be considered in the particular example herein illustrated that the optical terminations P2P_CT1 and P2P_CT4 are in service with the user modules P2P_ONU1 and P2P_ONU2 respectively. An optical termination is called in service when it is already involved in a point-to-point communication with a point-to-point user module via the point-to-point channel that has been assigned thereto beforehand, and that, consequently, it is in an unavailability state for the allocating its point-to-point channel to another point-to-point user module.

In turn, the optical termination P2P_CT2 is not connected to the multiplexer 110; it is therefore also considered as unavailable. In contrast, the optical termination P2P_CT3 is available. Thus, the point-to-point channel with the wavelength λ3 that is assigned thereto is a point-to-point channel considered as available and able to be allocated to a user module in order to establish a point-to-point communication via this channel.

It should be understood that the number of user modules and optical terminations (and therefore the number of point-to-point channels) discussed herein is intentionally limited, for purely pedagogical description purposes, so as not to overload the figure and the associated description. Indeed, a larger number of pieces of equipment may be considered without departing from the invention.

Figure 4:
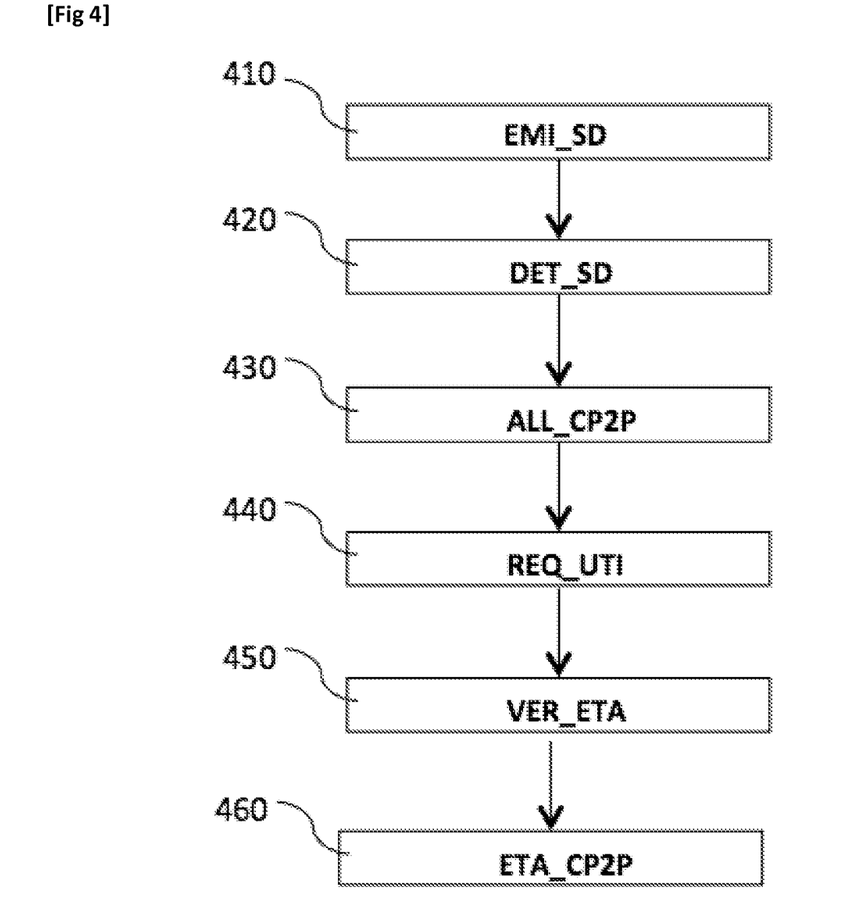
FIG. 4 is a flowchart of a particular embodiment of the method according to the invention.
Figure 5:
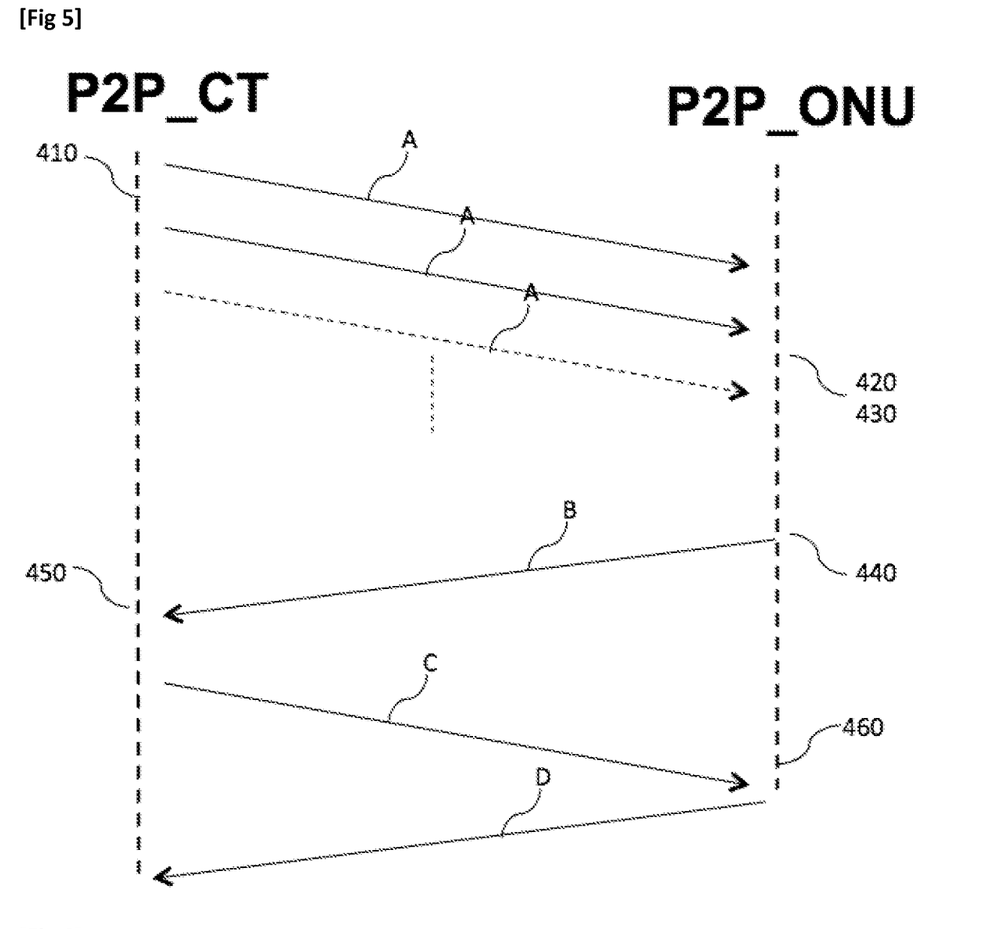
FIG. 5 presents an events chart showing in a generic way the progress of the method between a user module and an optical termination of the network.

FIG. 4 represents a flowchart of a particular embodiment of the allocation method according to the invention. This flowchart comprises the main steps for implementing the method, which are applied each time a request for allocating a point-to-point channel to a user module of the network is initiated. Some of these steps are performed by an optical termination called available termination of the network and others are performed by a user module, called requester of the network. In order to facilitate understanding of the present invention, these steps are also represented in FIG. 5 in the form of an events chart illustrating the progress of the method.

As discussed in more details hereinafter, the method is based on a new approach consisting in finding an available point-to-point channel amongst the set of point-to-point channels of the network upon detecting a predetermined availability signal conveyed by this channel.

The method is initialised upon request for allocating to a user module a point-to-point channel, amongst the set of point-to-point channels supported by the network 300. The introduction of a new user module P2P_ONU3 in the network 300 is herein considered. This new user module P2P_ONU3 is optically connected to the achromatic coupler 310 so that it is associated to the set of point-to-point channels of the network, with the wavelengths λ1, λ2, λ3 and λ4 (but still not allocated to any of these point-to-point channels).

At step 410 (denoted "EMI_SD"), for the allocating a point-to-point channel to the user module P2P_ONU3, the available optical termination P2P_CT3 of the terminal 350 proceeds with the emission of a predetermined availability signal over the point-to-point channel assigned thereto, that is to say the channel with the wavelength λ3. According to a particular implementation, the predetermined availability signal is continuously emitted and has a particular optical signature recognisable by all of the user modules of the network. The predetermined availability signal is materialised by the arrows A in FIG. 5 and its structure is detailed further hereinafter with reference to FIG. 6.

It should be noted that if several optical terminations of the network are available, each of these optical terminations emits the predetermined availability signal via the point-to-point channel assigned thereto.

According to a variant of implementation, the predetermined availability signal is discontinuously emitted by the optical termination, according to a predefined sequencing.

This enables the optical termination concerned by the emission to reduce its energy consumption.

Regardless of the emission mode implemented by the optical termination (continuous or discontinuous), the availability signal is emitted as long as no use query is received from a user module (as described later on in connection with step 440). Hence, the optical termination P2P_CT3 is put on hold waiting for a query for using a point-to-point channel originating from a user module having received the predetermined availability signal.

At step 420 (denoted "DET_SD"), the user module P2P_ONU3 requesting an allocation proceeds with a sequential scanning (or probing) of the different point-to-point channels associated thereto, in order to detect the predetermined availability signal that might be conveyed by one (or several) point-to-point channel(s) of the network 300. For this step, the user module P2P_ONU3 uses a "listen", or "receive", mode configuration. For this purpose, the user module P2P_ONU3 connects to (or is positioned on) a first point-to-point channel and verifies whether an availability signal is detected via this first point-to-point channel. For this purpose, the user module P2P_ONU3 has a local table, stored in its memory, comprising for example the list of all point-to-point channels of the network 300 to which it is associated (namely the channels with the wavelengths $\lambda 1$, $\lambda 2$, $\lambda 3$ and $\lambda 4$). The user module P2P_ONU3 then connects (in the receive-only mode) to (or is positioned on) the first point-to-point channel of the list, namely the channel with the wavelength $\lambda 1$ and verifies whether an availability signal is conveyed by this channel. Yet, in the present example, the availability signal emitted by the termination P2P_CT3 is not conveyed by the channel with the wavelength $\lambda 1$. Although point-to-point communications are exchanged over this first channel (recall that P2P_CT1 and P2P_ONU1 are in service), no availability signal is detected by the user module P2P_ONU3 over this first channel. Consequently, the user module P2P_ONU3 stops its connection with the channel with the wavelength $\lambda 1$ and connects (in the receive-only mode) to (or is positioned on) the second point-to-point channel of the list, namely the channel with the wavelength $\lambda 2$, and verifies whether the availability signal is conveyed by this second channel. Yet, no optical signal (including the availability signal) is detected over this second channel (the termination P2P_CT2 is not connected). The user module P2P_ONU3 then stops its connection with the channel with the wavelength $\lambda 2$ and connects (in the receive-only mode) to (or is positioned on) the third point-to-point channel of the list, namely the channel with the wavelength $\lambda 3$. This time, the user module P2P_ONU3 detects that an availability signal is actually conveyed by this third point-to-point channel, and then stops scanning of the point-to-point channels.

Thus, in this particular implementation, each point-to-point channel is probed by the user module until the latter detects the availability signal. After detecting the availability signal, probing is stopped and the point-to-point channel conveying the availability signal is considered as the available point-to-point channel to be allocated to the user module. This particular implementation aims to probe a reduced number of point-to-point channels, in order to reduce the energy consumption of the user module. This is a particular implementation of channels probing, and other implementations may of course be considered without departing from the context of the invention. For example, in another particular implementation, it may be considered that the user module proceeds with an exhaustive probing of all of the point-to-point channels and verifies whether a predetermined availability signal is detected for each probed point-to-point channel. Then, two situations may arise. In the case of a positive verification for one single point-to-point channel, this single point-to-point channel is allocated to the user module. In the case of a positive verification for a set of point-to-point channels, a point-to-point channel selected amongst said set of point-to-point channels, according to a predetermined communication quality criterion (for example the point-to-point channel having the highest point-to-point communication quality level of said set) is allocated to the user module.

It should also be noted that steps 410 and 420 may be activated either sequentially, that is to say the step of emission 410 by the optical termination and then the step of detection by the user module, or else they may be activated simultaneously.

At step 430 (denoted "ALL_CP2P"), the user module P2P_ONU3 then proceeds with the allocating the point-to-point channel with the wavelength $\lambda 3$ (available channel over which the availability signal is conveyed). In this example, the allocation is carried out by configuration of the transmitter internal to the user module P2P_ONU3 on the wavelength $\lambda 3$ in order to enable a communication over the point-to-point channel with the wavelength $\lambda 3$.

At step 440 (denoted "REQ_UTI"), the user module P2P_ONU3 then transmits over the allocated point-to-point channel with the wavelength $\lambda 3$ a query for using this point-to-point channel $\lambda 3$ towards the optical termination P2P_CT3. This step aims to inform the optical termination concerned by the available point-to-point channel (P2P_CT3) on the intent of the requester user module (P2P_ONU3) to establish a point-to-point communication with it via this channel.

The use query is materialised by the arrow B in FIG. 5.

Figure 6:
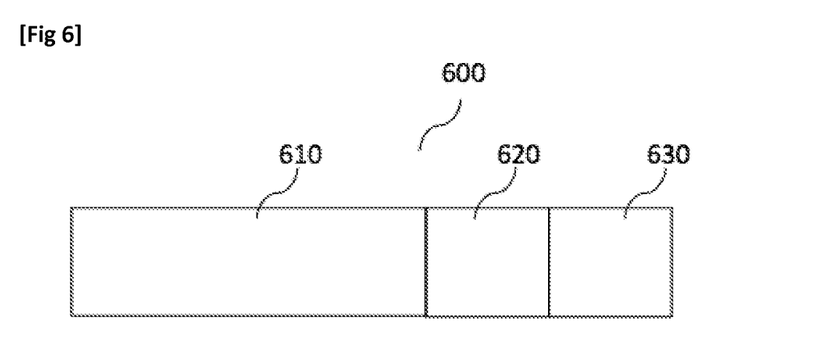
FIG. 6 presents an example of a structure of a predetermined availability signal used in the context of the invention.

It should be noted that when the user module P2P_ONU3 detects the availability signal on the point-to-point channel $\lambda 3$, the wavelength on which the user module P2P_ONU3 must be tuned to transmit the use query over this point-to-point channel $\lambda 3$ is determined either implicitly by recognizing the point-to-point channel $\lambda 3$ over which the availability signal is conveyed (a wavelength predefined in the standard), or explicitly by means of the information contained in the availability signal (whose principle is detailed later on with reference to FIG. 6).

At step 450 (denoted "REQ_UTI"), upon reception of the query for using the point-to-point channel $\lambda 3$, the optical termination P2P_CT3 stops the emission of the predetermined availability signal initiated at step 410 and begins a procedure of verifying the feasibility of the establishment of a point-to-point communication with the user module P2P_ONU3. Stopping the emission of the predetermined availability signal means that the optical termination P2P_CT3 is no longer available.

The procedure of verifying the feasibility of the establishment of a point-to-point communication consists in an exchange of one or several query(ies) between the optical termination P2P_CT3 and the user module P2P_ONU3 using the point-to-point channel $\lambda 3$ (materialised as example by the arrows C and D in FIG. 5). This procedure is based on a predefined point-to-point communication start protocol and is intended to stabilise the point-to-point connectivity between the two pieces of equipment.

In the case of a positive verification (of the feasibility of the establishment of a point-to-point communication with the user module P2P_ONU3), the allocating the point-to-point channel $\lambda 3$ to the user module P2P_ONU3 is considered to be successful and a point-to-point communication over the point-to-point channel λ3 is established (step 460) (denoted "ETA_CP2P"). The point-to-point channel λ3 is then considered as unavailable.

In the case of a negative verification (of the feasibility of the establishment of a point-to-point communication with the user module P2P_ONU3), the algorithm returns to step 410 of the method and the optical termination P2P_CT3 proceeds again with the emission of the predetermined availability signal over the point-to-point channel λ3. Prior to that, the optical termination P2P_CT3 may send to the user module P2P_ONU3 a query of failure of the allocating the point-to-point channel λ3, in order to inform it that the allocating the point-to-point channel λ3 has not finally succeeded and that this channel becomes available again.

The above-described determination method is initialised upon request for allocating an available point-to-point channel of a user module newly-introduced in the network. In this instance, this is a particular example of application and the method may be implemented on apparition or occurrence of one of the following events (non-exhaustive list):
  detecting a malfunction of an optical termination;
  preprogramed maintenance of an optical termination;
  introducing a new user module in the network;
  introducing a new optical termination in the network;
  detecting a point-to-point channel change request;
  detecting a communication quality level below a predetermined threshold between a user module and an optical termination of the network involved in a point-to-point communication.

The request for allocating an available point-to-point channel may be initiated by an optical termination or by a user module of the terminal or else by another piece of equipment for example by a managing module of the network 300 (independently of the user modules or of the optical terminations).

FIG. 6 illustrates a schematic example of an availability signal 600 in accordance with the present invention. The availability signal 600 comprises a header field 610, a useful data field 620 (encoded on 32 bits for example) and a protection field 630. The header field 610 is encoded for example on 32 bits in a NRZ (standing for "non-return-to-zero") type modulation, and contains an identifier of the optical termination emitter of the availability signal and information representative of the type of the signal conveyed herein, namely an availability signal. The useful data field 620 comprises information relating to the available point-to-point channel over which the availability signal is conveyed, namely the wavelength associated to the concerned point-to-point channel or the frequency associated to the concerned point-to-point channel or the reference number of the concerned point-to-point channel or else the modulation rate associated to the concerned point-to-point channel. The protection field 630 contains the data that are necessary to the application of protective encoding against errors of the header 610 and useful data 620 fields using an error-correcting code.

For example, the availability signal according to the invention may be transmitted in the form of a low-frequency clock signal (typically in the range of 1 MHz) whose signature allows differentiating it from the other known signals transmitted over the network 300.

Figure 7:
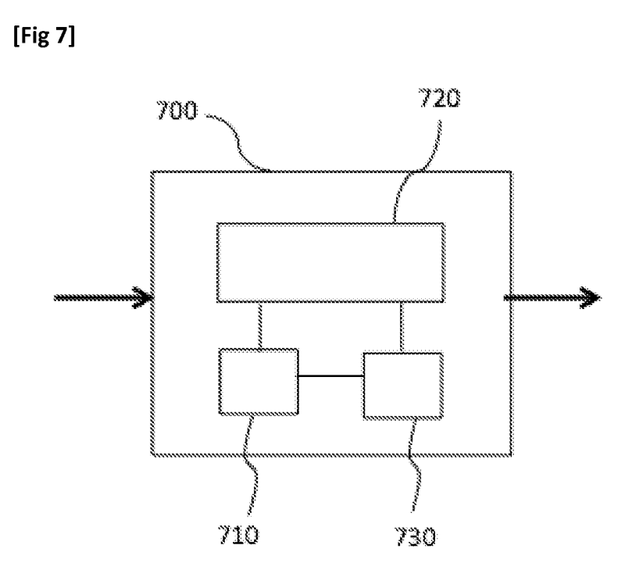
FIG. 7 presents the structure of an application server according to a particular embodiment of the invention.

FIG. 7 presents the simplified structure of a device 700 implementing the allocation method according to the invention (for example the particular embodiment described hereinabove with reference to FIGS. 4 to 6). This device 700 comprises a random-access memory 730 (for example a RAM memory), a processing unit 710 equipped for example with a processor, and driven by a computer program stored in a read-only memory 720 (for example a ROM memory or a hard disk). Upon initialisation, the code instructions of the computer program are for example loaded in the random-access memory 730 before being executed by the processor of the processing unit 710. Such a computer program enables the execution of part of the steps of the algorithm of FIG. 4 described hereinabove (steps 420, 430, 440, 460) if executed by a smart entity internal to the user module, or of the other part of the steps of the algorithm of FIG. 4 described hereinabove (410, 450), if executed by an optical termination.

In one variant, it is possible to consider that it is actually a smart entity external to the user module and to the optical termination that undertakes the completion of the step of allocating a point-to-point channel to the concerned user module. More particularly, it may be considered that it is this external entity (located for example in the central office CO) that initiates the algorithm of FIG. 6 and sends commands for executing the steps dedicated to the optical termination and to the user module respectively, according to the above-described principle.

This FIG. 7 illustrates only a particular way, amongst many others, for carrying out the different algorithms detailed hereinabove, with reference to FIG. 4. Indeed, the technique of the invention is carried out indifferently:
  on a reprogrammable calculation machine (a PC computer, a DSP processor or a microcontroller) executing a program comprising an instructions sequence, or
  on a dedicated calculation machine (for example a set of logic gates such as a FPGA or an ASIC or any other hardware module).

In the case where the invention is set up on a reprogrammable calculation machine, the corresponding program (that is to say the instructions sequence) may be stored in a storage medium, whether removable (such as a floppy disk, a CD-ROM or a DVD-ROM) or not, this storage medium being partially or totally readable by a computer or a processor.

The invention claimed is:

1. A method for allocating a point-to-point channel to a user module of an optical communication network, said network comprising user modules and optical terminations, and supporting point-to-multipoint channels and a plurality of point-to-point channels, one same point-to-point channel being assigned to one single optical termination, said method being implemented by at least one device for a user module called requester user module, and comprising:
  detecting a predetermined availability signal conveyed by a point-to-point channel of said plurality of point-to-point channels, and allocating the point-to-point channel over which said predetermined availability signal is conveyed, called available point-to-point channel, to said requester user module, wherein the detecting comprises verifying, on each point-to-point channel of said plurality of point-to-point channels, whether the predetermined availability signal is detected, and wherein the allocating comprises:
    in the case of a positive verification for one single point-to-point channel of said plurality, allocating said single point-to-point channel to said requester user module;
    in the case of a positive verification for a set of point-to-point channels of said plurality, allocating the point-to-point channel to said requester user module selected amongst said set of point-to-point channels, as function of a predetermined communication quality criterion.

2. The method according to claim 1, wherein the detecting is triggered on apparition of a condition belonging to the group consisting of:
   detecting a request for allocating a point-to-point channel;
   detecting a malfunction of an optical termination;
   deducting a preprogramed maintenance of an optical termination;
   introducing a new user module in the network;
   introducing a new optical termination in the network;
   detecting a point-to-point channel change request;
   detecting a communication quality level below a predetermined threshold between a user module and an optical termination of the network involved in a point-to-point channel of said plurality.

3. The method according to claim 1, further comprising, before allocating the available point-to-point channel, transmitting over the available point-to-point channel a query for using the available point-to-point channel, to the optical termination to which said available point-to-point channel is assigned.

4. The method according to claim 1, wherein an entity internal to the requester user module or external to the requester user module performs the allocating of the point-to-point channel.

5. A method for allocating a point-to-point channel to a user module of an optical communication network, said network comprising user modules and optical terminations, and supporting point-to-multipoint channels and a plurality of point-to-point channels, one same point-to-point channel being assigned to one single optical termination, said method being implemented by an optical termination of said plurality, called available optical termination, and comprises:
   emitting a predetermined availability signal over the point-to-point channel assigned to said available optical termination, called available point-to-point channel, towards the user modules, wherein the predetermined availability signal comprises information belonging to the group consisting of:
     information representative of a reference number associated to the available point-to-point channel;
     information representative of a wavelength associated to the available point-to-point channel:
     information representative of a frequency associated to the available point-to-point channel;
     information representative of a modulation rate associated to the available point-to-point channel; and
   queuing a query for using the available point-to-point channel, originating from a user module, called requester user module.

6. The method according to claim 5, further comprising, upon reception of the query for using the available point-to-point channel:
   stopping the emission of the predetermined availability signal over the available point-to point channel;
   verifying feasibility of establishment of a point-to-point communication over the available point-to-point channel between said requester user module and said available optical termination.

7. The method according to claim 6, further comprising:
   in the case of a positive verification, establishing a point-to-point communication over the available point-to-point channel between said requester user module and said available optical termination;
   in the case of a negative verification, re-emitting the predetermined availability signal over the available point-to-point channel.

8. The method according to claim 5, wherein the predetermined availability signal is emitted continuously.

9. The method according to claim 5, wherein the predetermined availability signal is emitted discontinuously.

10. A non-transitory computer-readable medium comprising program code instructions stored thereon which when executed by a processor configure the processor to implement a method for allocating a point-to-point channel to a user module of an optical communication network, said network comprising user modules and optical terminations, and supporting point-to-multipoint channels and a plurality of point-to-point channels, one same point-to-point channel being assigned to one single optical termination, said method being implemented for a user module called requester user module, and comprising:
   detecting a predetermined availability signal conveyed by a point-to-point channel of said plurality of point-to-point channels, and allocating the point-to-point channel over which said predetermined availability signal is conveyed, called available point-to-point channel, to said requester user module, wherein the detecting comprises verifying, on each point-to-point channel of said plurality of point-to-point channels, whether the predetermined availability signal is detected, and wherein the allocating comprises:
     in the case of a positive verification for one single point-to-point channel of said plurality, allocating said single point-to-point channel to said requester user module;
     in the case of a positive verification for a set of point-to-point channels of said plurality, allocating the point-to-point channel to said requester user module selected amongst said set of point-to-point channels, as function of a predetermined communication quality criterion.

11. A device for allocating a point-to-point channel to a user module of an optical communication network, said network comprising user modules and optical terminations, and supporting point-to-multipoint channels and a plurality of point-to-point channels, one same point-to-point channel being assigned to one single optical termination, said device comprising, for a user module called requester user module:
   a processor; and
   a non-transitory computer-readable medium comprising instructions stored thereon which when executed by the processor configure the device to:
   detect a predetermined availability signal conveyed by a point-to-point channel of said plurality of point-to-point channels, and allocating the point-to-point channel over which said predetermined availability signal is conveyed, called available point-to-point channel, to said requester user module, wherein the detecting comprises verifying, on each point-to-point channel of said plurality of point-to-point channels, whether the predetermined availability signal is detected, and wherein the allocating comprises:
     in the case of a positive verification for one single point-to-point channel of said plurality, allocating said single point-to-point channel to said requester user module;
     in the case of a positive verification for a set of point-to-point channels of said plurality, allocating the point-to-point channel to said requester user module selected amongst said set of point-to-point channels, as function of a predetermined communication quality criterion.

12. An optical termination for implementation in an optical communication network, comprising user modules and optical terminations, and supporting point-to-multipoint channels and a plurality of point-to-point channels, one same point-to-point channel being assigned to one single optical termination, said optical termination comprising:

a processor; and a non-transitory computer-readable medium comprising instructions stored thereon which when executed by the processor configure the optical termination to:

emit a predetermined availability signal over the point-to-point channel assigned to said available optical termination, called available point-to-point channel, towards the user modules, wherein the predetermined availability signal comprises information belonging to the group consisting of:

information representative of a reference number associated to the available point-to-point channel;

information representative of a wavelength associated to the available point-to-point channel:

information representative of a frequency associated to the available point-to-point channel;

information representative of a modulation rate associated to the available point-to-point channel; and queue a query for using the available point-to-point channel originating from a user module, called requester user module.

* * * * *